(12) United States Patent
Ghosh et al.

(10) Patent No.: US 9,098,698 B2
(45) Date of Patent: Aug. 4, 2015

(54) METHODS AND APPARATUS FOR APPLICATION ISOLATION

(75) Inventors: Anup Ghosh, Centreville, VA (US); Yih Huang, Fairfax, VA (US); Jiang Wang, Fairfax, VA (US); Angelos Stavrou, Springfield, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 801 days.

(21) Appl. No.: 12/558,841

(22) Filed: Sep. 14, 2009

(65) Prior Publication Data

US 2010/0122343 A1 May 13, 2010

Related U.S. Application Data

(60) Provisional application No. 61/096,591, filed on Sep. 12, 2008.

(51) Int. Cl.
*H04L 29/06* (2006.01)
*G06F 21/55* (2013.01)

(52) U.S. Cl.
CPC ........ *G06F 21/55* (2013.01); *G06F 2221/2149* (2013.01)

(58) Field of Classification Search
CPC ............ G06F 21/55; G06F 2221/2113; G06F 2221/2149
USPC ......................................................... 726/23
See application file for complete search history.

(56) References Cited

U.S. PATENT DOCUMENTS

| | | |
|---|---|---|
| 6,211,871 B1 | 4/2001 | Himmel et al. |
| 6,397,242 B1 * | 5/2002 | Devine et al. ...................... 718/1 |
| 6,832,120 B1 | 12/2004 | Frank et al. |
| 7,392,541 B2 | 6/2008 | Largman et al. |
| 7,536,598 B2 | 5/2009 | Largman et al. |
| 7,552,479 B1 | 6/2009 | Conover et al. |
| 7,584,503 B1 | 9/2009 | Palmer et al. |
| 7,693,991 B2 | 4/2010 | Greenlee et al. |
| 7,840,801 B2 | 11/2010 | Berger et al. |

(Continued)

OTHER PUBLICATIONS

Jiang et al., "Stealthy malware detection through vmm-based out-of-the-box semantic view reconstruction", 2007, Proceedings of the 14th ACM conference, pp. 128-138.*

(Continued)

*Primary Examiner* — Bradley Holder
*Assistant Examiner* — Ali Shayanfar

(57) ABSTRACT

Processor(s) for detecting malicious software. A hardware virtual machine monitor (HVMM) operates under a host OS. Container(s) initialized with network application template(s) operate under a guest OS VM. A detection module operates under the guest OS VM includes a trigger detection module, a logging module and a container command module. The trigger detection module monitors activity on container(s) for a trigger event. The logging module writes activity report(s) in response to trigger event(s). The container command module issues command(s) in response to trigger event(s). The command(s) include a container start, stop and revert commands. A virtual machine control console operates under the host OS and starts/stops the HVMM. A container control module operates under the guest OSVM and controls container(s) in response to the command(s). The server communication module sends activity report(s) to a central collection network appliance that maintains a repository of activities for infected devices.

17 Claims, 12 Drawing Sheets

(56) References Cited

U.S. PATENT DOCUMENTS

| | | | |
|---|---|---|---|
| 7,899,867 B1 | 3/2011 | Sherstinsky et al. | |
| 7,979,889 B2 | 7/2011 | Gladstone et al. | |
| 8,001,606 B1 | 8/2011 | Spertus | |
| 8,078,740 B2* | 12/2011 | Franco et al. | 709/229 |
| 8,290,763 B1* | 10/2012 | Zhang | 703/26 |
| 8,370,931 B1 | 2/2013 | Chien et al. | |
| 8,401,982 B1 | 3/2013 | Satish et al. | |
| 8,468,600 B1 | 6/2013 | Kaskel et al. | |
| 8,479,286 B2 | 7/2013 | Dalcher et al. | |
| 8,572,735 B2 | 10/2013 | Ghosh et al. | |
| 8,694,797 B2* | 4/2014 | Challener et al. | 713/190 |
| 8,776,038 B2* | 7/2014 | Larimore et al. | 717/168 |
| 2004/0008652 A1 | 1/2004 | Tanzella et al. | |
| 2004/0025158 A1 | 2/2004 | Traut | |
| 2004/0064735 A1 | 4/2004 | Frazier et al. | |
| 2004/0093372 A1 | 5/2004 | Chen et al. | |
| 2005/0160133 A1 | 7/2005 | Greenlee et al. | |
| 2006/0021029 A1 | 1/2006 | Brickell et al. | |
| 2006/0136720 A1 | 6/2006 | Armstrong et al. | |
| 2006/0168156 A1 | 7/2006 | Bae et al. | |
| 2006/0271661 A1 | 11/2006 | Qi et al. | |
| 2006/0294519 A1* | 12/2006 | Hattori et al. | 718/1 |
| 2007/0044151 A1 | 2/2007 | Whitmore | |
| 2007/0079307 A1* | 4/2007 | Dhawan et al. | 718/1 |
| 2007/0107058 A1 | 5/2007 | Schuba et al. | |
| 2007/0192866 A1 | 8/2007 | Sagoo et al. | |
| 2007/0240212 A1 | 10/2007 | Matalytski | |
| 2007/0271610 A1* | 11/2007 | Grobman | 726/22 |
| 2007/0289019 A1 | 12/2007 | Lowrey | |
| 2008/0016339 A1 | 1/2008 | Shukla | |
| 2008/0059556 A1 | 3/2008 | Greenspan et al. | |
| 2008/0082976 A1 | 4/2008 | Steinwagner et al. | |
| 2008/0141266 A1 | 6/2008 | Hunt et al. | |
| 2008/0244747 A1 | 10/2008 | Gleichauf et al. | |
| 2008/0320594 A1* | 12/2008 | Jiang | 726/24 |
| 2009/0044265 A1 | 2/2009 | Ghosh et al. | |
| 2009/0055693 A1* | 2/2009 | Budko et al. | 714/57 |
| 2009/0113423 A1* | 4/2009 | Hiltgen et al. | 718/1 |
| 2009/0125902 A1* | 5/2009 | Ghosh et al. | 718/1 |
| 2009/0158432 A1 | 6/2009 | Zheng et al. | |
| 2009/0254572 A1* | 10/2009 | Redlich et al. | 707/10 |
| 2009/0300739 A1 | 12/2009 | Nice et al. | |
| 2009/0328008 A1 | 12/2009 | Mital et al. | |
| 2010/0037235 A1* | 2/2010 | Larimore et al. | 719/312 |
| 2010/0064039 A9* | 3/2010 | Ginter et al. | 709/224 |
| 2010/0115621 A1 | 5/2010 | Staniford et al. | |
| 2010/0122342 A1 | 5/2010 | El-Moussa et al. | |
| 2010/0125903 A1 | 5/2010 | Devarajan et al. | |
| 2010/0138639 A1 | 6/2010 | Shah et al. | |
| 2010/0223613 A1 | 9/2010 | Schneider | |
| 2011/0047620 A1 | 2/2011 | Mahaffey et al. | |
| 2011/0099620 A1 | 4/2011 | Stavrou et al. | |
| 2011/0167492 A1 | 7/2011 | Ghosh et al. | |
| 2012/0297457 A1 | 11/2012 | Schulte et al. | |
| 2013/0145463 A1 | 6/2013 | Ghosh et al. | |

OTHER PUBLICATIONS

King et al, "SubVirt: Implementing malware with virtual machinesand Privacy", 2006, IEEE , 14 pp. - 327.*
Royal et al, "malware analysis via hardware virtualization extensions", 2008, 15th ACM conference, pp. 51-62.*
Office Action mailed Aug. 2, 2012 for U.S. Appl. No. 12/757,675, filed Apr. 9, 2010.
Office Action mailed Oct. 27, 2011 for U.S. Appl. No. 12/037,412, filed Feb. 26, 2008.
Final Office Action mailed Apr. 23, 2012 for U.S. Appl. No. 12/037,412, filed Feb. 26, 2008.
Office Action mailed Feb. 2, 2011 for U.S. Appl. No. 12/059,454, filed Mar. 31, 2008.
Final Office Action mailed Oct. 12, 2011 for U.S. Appl. No. 12/059,454, filed Mar. 31, 2008.
Sapuntzakis, et al., "Virtual Appliances for Deploying and Maintaining Software," [online] (2003), ACM, pp. 1-15, Retrieved from the Internet <URL: http://people.csail.mit.edu/nickolai/papers/sapuntzakis-deploying.pdf>.
Office Action for U.S. Appl. No. 13/690,452, mailed Nov. 8, 2013.
International Search Report and Written Opinion mailed Mar. 12, 2013 for International Application No. PCT/US2012/067311.
Office Action for U.S. Appl. No. 12/037,412, mailed Aug. 16, 2013.
Office Action for U.S. Appl. No. 12/827,203, mailed Jan. 15, 2013.
Office Action for U.S. Appl. No. 12/827,203, mailed Apr. 17, 2014.
Adabala et al, From virtualized resources to vritual computing grids: the In-VIGO system. [online] (Nov. 11, 2003), Elsevier, pp. 1-14. Retrieved from the Internet: <http://users.cis.fiu.edu/-zhaom/research/fgcs.pdf>.
Huang, Y. et al., Efficiently tracking application interactions using lightweight virtualization, ACM, Oct. 31, 2008, 9 pages.
Peterson et al., "A Flexible Containment Mechanism for Executing Untrusted Code," [online] (2002). University of California, pp. 207-225. Retrieved from the Internet: <http://mse.uk.distfiles.macports.org/sites/ftp.wiretapped.net/pub/security/development/secure-programming/peterson-et-al-2002-a-flexible-containment-mechanism-for-executing-untrusted>.
Ugurlu, "Stealth Sandbox Analysis of Malware," PhD Thesis, Bilkent University (Ankara, Turkey) [online], Published Aug. 2009 [retried on Feb. 7, 2013] Retrieved from the Internet <URL:http://www.thesis.bilkent.edu.tr/0003921.pdf>.
Royal et al., "*PolyUnpack: Automating the Hidden-Code Extraction of Unpack-Executing Malware*", Computer Security Applications Conference, 2006. ACSAC '06. 22$^{nd}$ Annual [online], Dec. 2006 [retrieved Apr. 4, 2014], Retrieved from the internet:<URL: <http://ieeexplore.ieee.org/stamp/stamp.jsp?tp=&arnumber=4041175>.
Office Action for U.S. Appl. No. 13/690,452, mailed Jun. 12, 2014.
Office Action for U.S. Appl. No. 13/690,452, mailed Jan. 30, 2015.

* cited by examiner

| Monitoring Location | Operation | Average Latency |
|---|---|---|
| Internet Cleanroom | specialize a pre-configured browser instance | 2.9 seconds |
| | revert VM, start browser | 14.2 seconds |
| VVM method | Warm-start Firefox | 9.1 seconds |
| | Cold-start Firefox | 23.2 seconds |
| native Firefox on Windows | Warm-start Firefox | 1.5 seconds |
| | Cold-start Firefox | 9.2 seconds |

Table 1. Startup delay for Internet Cleanroom

FIG. 7A

| Monitoring Location | throughput (download 3GB file) MB/s |
|---|---|
| Internet Cleanroom | 88.0 |
| VVM ethod | 86.2 |
| native Windows | 90.0 |

Table 1. Malicious website testing

FIG. 7B

| Monitoring Location | Total Websites | Malicious websites detected drive-by download |
|---|---|---|
| Internet Cleanroom | 2000 | 0 |
| native Firefox on Windows | 2000 | 6 |

Table 3. Malicious website testing

FIG. 7C

METHODS AND APPARATUS FOR APPLICATION ISOLATION

CROSS-REFERENCE TO RELATED APPLICATIONS

This application claims the benefit of U.S. Provisional Application No. 61/096,591, filed Sep. 12, 2008, entitled "Large-Scale Distributed Sensor for Detecting Malicious Web Sites via a Virtualized Web Browser," which is hereby incorporated by reference in its entirety.

STATEMENT REGARDING FEDERALLY SPONSORED RESEARCH OR DEVELOPMENT

This invention was made with government support under Grant Number W31P4Q-07-C-0244 awarded by Defense Advanced Research Projects Agency (DARPA). The government has certain rights in the invention.

BACKGROUND

Due to their enormous code-base, client side network applications have become a significant risk to the operating system and their users. Unfortunately, signature based anti-virus and intrusion detection systems are ineffective in preventing new attacks. In addition, current application sandboxing mechanisms are either not strong enough or hard to deploy to the end user's desktop.

Currently, network applications have become the new attack vector posing significant risk to end-user's computing environment. These applications increasingly operate on untrusted sources of data and code. For example, a typical user uses a web browser for multiple tasks such as: reading news, performing on-line banking, shopping on-line or playing on-line games, all in the same session. If any of the web sites visited by the user hosts malicious software, the web browser or the user's computer may become compromised. Once compromised, the user may lose control to a malicious remote controller who can use the computer as he wishes. Typical cases of malware can transform the infected computer into a remotely controlled bot as part of a larger bot collective. Spam, hosting malicious software, stealing personal and sensitive data including user IDs and passwords for banking sites are just a few among many observed uses of infected machines.

This kind of attack is called an intra-application attack because it uses just one application. Cross-site scripting attacks belong to this class and one recent example happened on Gmail. Drive-by downloading is another common intra-application attack for web browsers, and researchers from Google have found many malicious URLs containing drive-by downloads on the Internet.

Another kind of attack is inter-application attacks which utilizes more than one application. In this case, the attacker can put the malicious content in a video file and allure the user to open it. Since Windows Media player uses Internet Explorer (IE) as the browser, even if the user installed Firefox as the default browser, the malicious video file can exploit the vulnerabilities of IE without the user's knowledge.

Standard defenses against these Internet-borne attacks employ antivirus software, personal firewalls, spyware detectors, and intrusion detection systems. Anti-virus software and IDSs are normally signature based and can detect known attacks. However, they are inefficient in detecting new attacks and dealing with polymorphic viruses. Personal firewalls are susceptible to being disabled by kernel-level rootkits.

Sandboxing is another method to protect the end user's computer. Different levels of sandboxing are feasible, ranging from language software fault isolation, process level system call mediation, to hardware virtualization. Unfortunately, language and process level sandboxing are susceptible to bypass, and current hardware virtualization sandboxing, such as the Tahoma system, separates the applications as well as the data that they usually share, therefore sacrificing usability. In addition, the Tahoma browser needs help from the web server, only protects the browser applications and is hard to deploy.

What is needed is a clean and isolated environment for instances of network applications to run in combination with a detection mechanism that can detect, act upon and report unauthorized intrusions into the isolated environment.

BRIEF DESCRIPTION OF THE SEVERAL VIEWS OF THE DRAWINGS

FIG. 7A shows startup delay measurements using an aspect of an embodiment of the present invention.

FIG. 7B shows throughput measurements using an aspect of an embodiment.

FIG. 7C shows results of detecting malicious downloads from websites using an aspect of an embodiment.

DETAILED DESCRIPTION OF EMBODIMENTS

Figure 1:
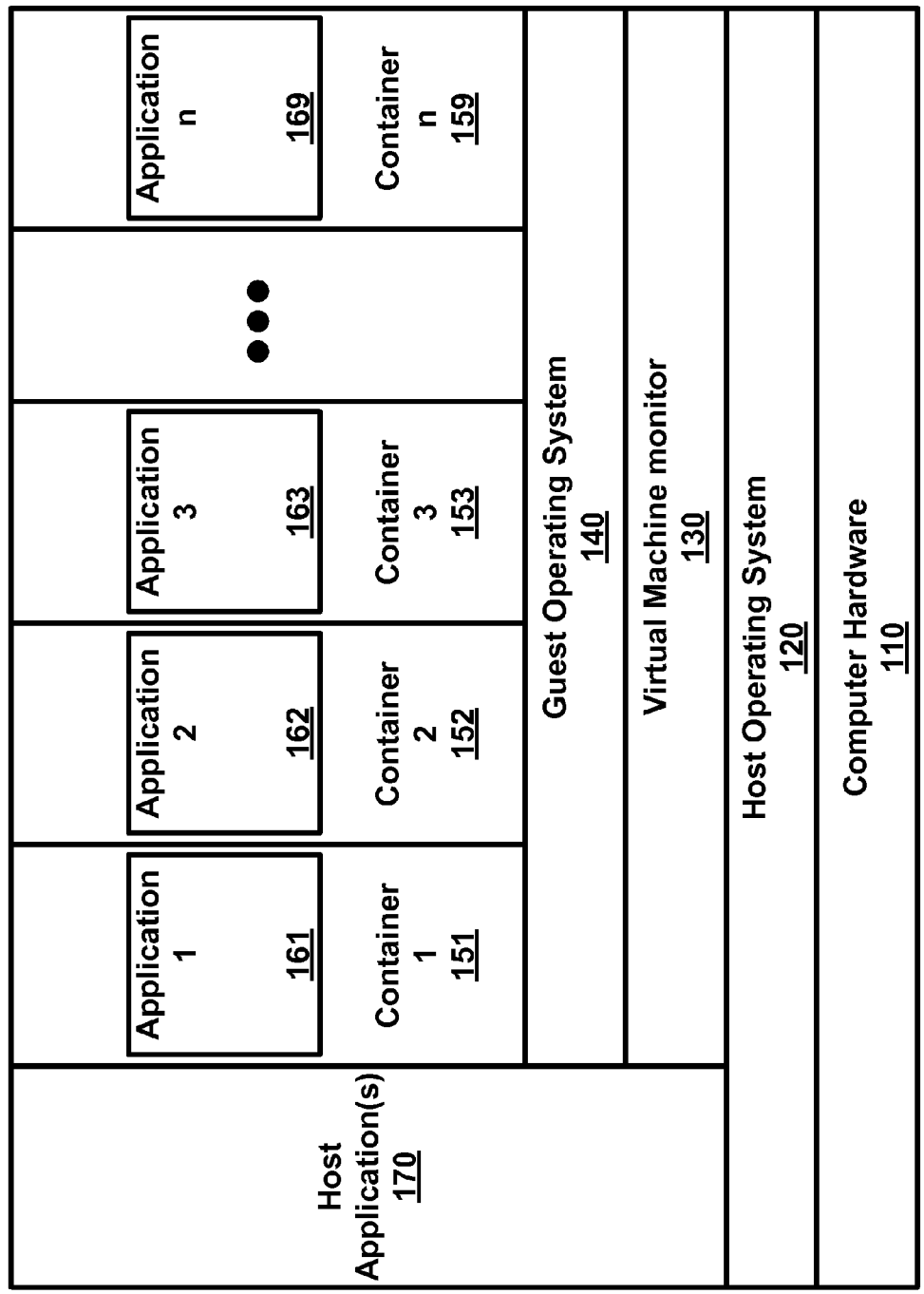
FIG. 1 is a block diagram of an architecture of an aspect of an embodiment of the present invention.

Embodiments of the present invention provide a clean and isolated environment for network applications and instances of network applications by using two levels of virtualization technologies. Embodiments ensure the network applications always start in a clean environment and restore the environment to its pristine state once malicious software is detected. A detection mechanism runs outside of light-weight virtualization to detect the intrusions. Some embodiments support diverse network applications, such as web browser, email client, instant messaging and so on. Evaluations of realized embodiments have shown show that they can prevent network attacks with low overhead and that users do not need to sacrifice performance for security.

To protect intra and inter-application attacks from the Internet, embodiments of the present invention uses a system architecture, called Internet Cleanroom which creates a clean virtual environment, called a Cleanroom, on-demand for the applications and instances of applications with low overhead and acceptable performance. Internet Cleanroom was designed with the following properties in mind: being able to isolate every instance of applications; being able to isolate different applications; ensuring that the Cleanroom is always clean; and providing usage transparency.

Being able to isolate every instance of applications: Every instance of an application may have its own Cleanroom. This can prevent intra-application attacks. It can be especially important for web browsers, so that a user can run different web applications such as on-line banking and on-line gaming in different Cleanrooms. Even if the on-line gaming website contains some malicious contents, it will not affect the on-line banking session.

Being able to isolate different applications: This property prevents inter-application attacks. With Internet Cleanroom, different applications run in their own Cleanrooms. Embodiments build virtual environment for browser, office and email client respectively, and may add other applications. In the office Cleanroom, there is no browser installed, so that the risks for inter-application attacks are minimized.

Ensure the Cleanroom is always clean: This property may be achieved using a detection mechanism (such as an anomaly detection mechanism) to detect unauthorized changes to the Cleanroom. Since the initial state of the Cleanroom is provided, the system knows what the clean state is and may assume that anything else is potentially malicious. This method should detect day zero attacks that will be missed by signature based detection mechanism. Once unauthorized changes are detected, the Cleanroom may be restored to its pristine state to easily remove the malware. At the same time, persistent storage may be provided for the Cleanroom to let the user save data persistently. Semi-persistent storage may also be provided to keep normal configuration data automatically, such as browser bookmarks.

Provide usage transparency: This property may be achieved by deploying an Internet Cleanroom such that it is tightly integrated into the user's desktop. The user experience while using the system may be the same as or very close to the standard desktop environment.

These properties are intended to make sure that exploit to one application will not affect other applications and the host. Complex applications such as a browser may be divided into multiple instances and separated from each other. Also, the virtual environment may be initialized to a clean state and restored to this clean state once unauthorized changes are detected.

Contributions of current embodiments of the present invention include a system architecture which has the following properties: 1) a strong isolation between Internet applications and the host OS; 2) support the commercial Internet applications so that user can still use their favorite applications; 3) deployment on commercial operating systems; 4) a detection module to detect unauthorized changes, and 5) tight integrate into a users' desktop.

A prototype embodiment 200 was built to demonstrate an embodiment of the present invention. It used VMware workstation (available from VMWARE Inc. of Palo Alto, Calif. on Windows XP (available from Microsoft Corp. of Redmond, Wash.) as hardware level virtualization to separate applications from the host OS. It also used OpenVZ for Linux (available through on the web at "openvz dot org") as light weight virtualization that runs on top of the VMware virtual machine to separate different applications and instances of applications. Thus, this prototype embodiment showed that the Internet Cleanroom not only provided a strong isolation between Internet applications and the user's desktop but also is scalable to a multitude of applications running at the same time. The prototype embodiment 200 also included an anomaly detection module to monitor the state of the Cleanroom. Once it detected unauthorized changes, it alerted the user to restore the Cleanroom to its pristine state. Security and performance of the Internet Cleanroom were evaluated. In 2000 malicious websites that compromised a normal Windows operating system, none of them compromised the prototype embodiment 200, and the performance of the prototype embodiment 200 was acceptable.

This section describes virtualization technologies that may be used to implement embodiments of the present invention, including: VMware workstation and OpenVZ, and stackable file system—aufs.

There are different levels of virtualization technologies, from the lowest hardware level virtualization such as VMware Workstation and Xen (available on the web at "zen dot org"), to operating system virtualization as OpenVZ (available on the web at "openvz dot org") and Solaris Zones (available from Sun Microsystems, Inc. of Santa Clara, Calif.), to process virtualization as Java virtual machine. Hardware level virtualization virtualizes hardware resources (CPU, memory and hard disk etc) so that it can run Linux on top of Windows OS. The software layer may provide virtualization called a virtual machine monitor or hypervisor. A hypervisor can run on bare hardware (Type 1 or native VM) or on top of an operating system (Type 2 or hosted VM). One embodiment uses VMware workstation, a Type 2 VM for Internet Cleanroom. The OS running inside the virtual machine is called the guest OS, and the original OS is called host OS. The virtual machine monitor provides the separation between the guest OS and the host OS. So even if the guest OS kernel is compromised, the malware will still need to penetrate the virtual machine monitor to infect the host OS. This property is called strong isolation.

The OS level virtualization virtualizes the resources on an operating system level. It may use a single OS kernel to provide an illusion of multiple operating systems for the user level applications. Each is called a virtual environment (VE) or a container. All the containers and the host may share the single kernel. The OS kernel may provide separation between different containers and between the containers and the host. An advantage of OpenVZ and other operating system virtualization solutions is the performance when compared to hardware virtualization, because they do not require a hypervisor instruction trapping or a separate kernel. A disadvantage may be that all the containers may share a single kernel and if the kernel crashes or is compromised, then all the VEs may be compromised.

Stackable file system, unionfs and aufs will now be discussed. Unionfs was first presented by researchers at Stony Brook University. It is a stackable file system on Linux that can merge a set of directories (called branches) into a single logical view. Each branch has a priority and may be read-only or read-write. While the highest priority branch is writable, Unionfs provides copy-on-write semantics for read-only branches. Aufs (available on the web at aufs "aufs dot sourceforge dot net"), is an open source project which shares the basic features of Unionfs but is re-designed and re-implemented to be more reliable.

For example, suppose there are three directories, named rr, ww and zz. Rr contains file r, ww contains file w and zz is empty. Next mount a as read-only and ww as read-write to zz; the zz directory then contains r and w file (the union view of rr and ww directory). If a new file is created inside zz directory, it will also show up in ww directory too because it is read-write. If one writes to r file which is inside a read-only layer, unionfs (or aufs) system will copy it to read-writer layer (ww) and write to it.

Aufs may be used to create containers on-the-fly. Further details are discussed later in this disclosure.

A goal of embodiment(s) of the present invention is to seamlessly virtualize vulnerable network applications and their instances in pristine single-use operating systems, while providing data persistence as required. To achieve this, a virtual environment is provided for networked applications while re-directing local executions of networked applications to the virtual environment. The virtual environment may be pre-configured for each network application and instances of application. Requirements and a design of an embodiment will now be described.

There are different levels of virtualization technologies, from the lowest hardware level virtualization such as VMware Workstation and Xen, to operating system virtualization as OpenVZ and Solaris, to process virtualization as Java virtual machine. Normally, the lower the level is the stronger isolation it can provide. On the other hand, the higher level tends to have lower overhead than the lower level. For the currently described embodiment, it was desired to have both strong isolation properties to protect the user's desktop and applications 170 and also a low overhead to run a multiple of applications (161, 162, . . . 169) on one physical machine 110. (See FIG. 1). So, an operating system (OS) level virtualization may be run on top of hardware virtualization 130. Thus, the hardware level virtualization 130 provides strong isolation between network applications (161, 162, . . . , 169) and the host OS 120, and the OS level virtualization (151, 152, . . . , 159) provides isolation between different applications (161, 162, . . . 169) and a guest OS 140 with lower virtualization overhead. In this embodiment, there is only one hardware virtual machine (VM) 130 running and many OS level virtual environments (151, 152, . . . , 159) called containers running on top of VM 130. Each application (161, 162, . . . , 169) runs inside a container.

Figure 2:
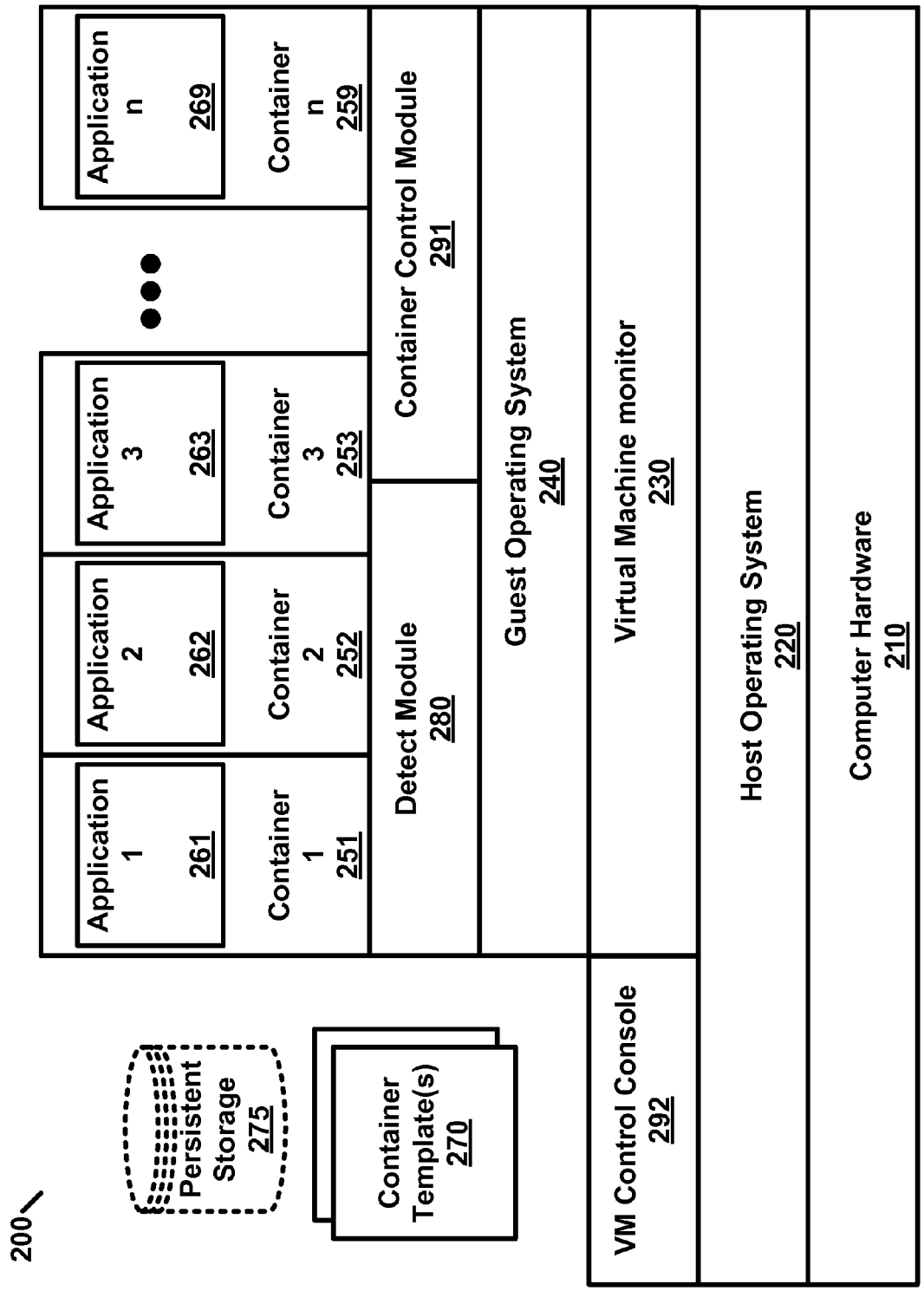
FIG. 2 is a block diagram of an architecture of an alternative embodiment of the present invention.

Referring to FIG. 2, a further discussion of an architecture of an alternative embodiment that enables on-demand virtual machine creation will now be discussed. To ensure a clean environment, every time a user starts a network application (261, 262, 263, . . . , 269) from a host 220, a new container (251, 252, 253, . . . , 259) may be created for it and the application (261, 262, 263, . . . , 269) started in the new container (251, 252, 253, . . . , 259). The new container (251, 252, 253, . . . , 259) may be created from a clean container template built 270 with just the software required for the designated application. For example, a browser such as Mozilla Firefox can be run on a relatively small distribution of Linux container. Xserver may be used to project the display of the application to the Windows host 220 and hide the virtual machine window. Since the user never interacts with the OS in the container (251, 252, 253, . . . , 259), even Windows users who may not be comfortable with Linux do not need to interface with the underlying Linux system. Using diverse operating systems also provides additional security benefits. Exploits that work against Firefox running on Windows in many cases will not implant on Firefox running on Linux. The use of OS level virtualization allows fairly fast creation of multiple containers (251, 252, 253, . . . , 259) for each application (261, 262, 263, . . . , 269) and a low overhead. In addition, the container template 270 may be kept offline so that it does not get compromised. Corruptions introduced in an online session may be discarded after the session terminates or when unauthorized changes are detected. Any malicious software downloaded during the session or any hackers present during the session are discarded with a container (251, 252, 253, . . . , 259). Next time the application is started, a pristine container (251, 252, 253, . . . , 259) may be instantiated to provide a clean environment for the application container (261, 262, 263, . . . , 269), hence its designation as a single use operating system.

The detection module 280 will now be discussed. The function of the detection module 280 is to detect any unauthorized changes inside a container (251, 252, 253, . . . , 259). Although strictly speaking, the detection module 280 may not be needed, it can be useful for providing information to the user if a container (251, 252, 253, . . . , 259) has been infected. Since the container (251, 252, 253, . . . , 259) for each application container (261, 262, 263, . . . , 269) may be preconfigured and customized, it is feasible to use anomaly detection to detect any unauthorized changes. Other types of change detection may be used. In addition, the detection module 280 may exclude legal changes such as the cache and cookies generated by the browser applications. Once unauthorized changes are detected, the user may be notified to discard the current container (251, 252, 253, . . . , 259) and create a new one. This step could be automated so that a user is not relied upon to keep a Cleanroom clean.

Persistent Storage 275 will now be discussed. Normally, the whole container (251, 252, 253, . . . , 259) is usually discarded after its usage, no information is kept for that container (251, 252, 253, . . . , 259) after it terminates. This may cause some problems if the user wants to save some data from the current session, such as downloaded documents from the browser. To address this issue, the concept of persistent storage 275 is introduced for temporary containers (251, 252, 253, . . . , 259). Persistent storage 275 may be set up as a shared directory on the file system of a host operating system 220 or a networked file system for the user to store documents linked to the temporary containers (251, 252, 253, . . . , 259). To address the security requirement that malicious code or intruders in the containers (251, 252, 253, . . . , 259) not be granted unfettered access to the host operating system 220, the portion of the host operating system 220 visible to the container (251, 252, 253, . . . , 259) may be restricted to only to the persistent storage directory 270. This should limit the access of a malicious or compromised container (251, 252, 253, . . . , 259) to only the persistent storage directory 275. However, since the container (251, 252, 253, . . . , 259) has visibility to this directory, the contents of this directory may be made to be short-lived by moving any files stored in the directory to permanent storage on the user's host machine 210, for example in the user's My Documents profile directory.

This approach ensures users can save documents from the temporary containers (251, 252, 253, . . . , 259) on to the host machine 210 in a temporary location while not exposing the rest of the host operating system 220 to untrusted containers (251, 252, 253, . . . , 259). Users define the locations of the temporary and permanent directories for persistent storage 275.

Browser containers and semi-persistent storage will now be discussed. Normally, one application corresponds to one container, such as email client, instant messaging and office applications. But some applications such as browser applications may be separated into multiple containers because the browser can be used for different purposes. Two classes of browser applications may be distinguished, one class is private or financial related, such as on-line banking. The other class is public and non-financial related, such as reading news. One container may be provided for all the public browsing activities while providing individual containers for every link belonging to private browsing. The private containers may be pre-configured and have their own directories for cookies, history and browser passwords. This process can prevent cross-site scripting on the client side, because the malicious links, which come from public containers, run in a different container from the private links and has no information about cookies and history of private links. These are called private links security bookmarks and may be used to ensure that the public containers do not visit these security bookmarks.

Residual risks/mitigations will now be discussed. The disclosed approach depends on the assumption that malware won't escape the container and the virtual machine and execute on the host OS 220 directly. The OS level virtualization layer provides and enforces separation between processes (261, 262, 263, ... , 269) assigned to the container (251, 252, 253, ... , 259). The hardware level virtualization provides additional separation between the containers (251, 252, 253, ... , 259) and the host operating system 220. If the implementation of the OS level virtualization is flawed, the malware may compromise other containers (251, 252, 253, ... , 259) and the virtual machine 230, which is the host for all the containers (251, 252, 253, ... , 259). If the implementation of hardware level virtualization is flawed, it may be possible for a guest process to access memory of host processes. As a result, the separation and memory management of the virtualization layer may be a lynchpin for the isolation properties of the virtualization. In a similar vein, many virtualization solutions offer a set of virtualization services, such as the ability to share directories, access hardware I/O devices, copy and paste between windows, among others. These services are the common target of malicious guest processes to obtain privileges on the host, also known as "escaping the VM." In these cases, Internet Cleanroom may not protect the host.

What is important to consider in this discussion is the frequency of these vulnerabilities being found. A risk management approach is to deploy technologies that are not necessarily infallible, but less likely to be defeated. The attack surface area, or the space of vulnerabilities presented to attackers, attributable to the virtualization-based solution is significantly less than that presented by buggy applications and operating systems. The reason is the interface to the virtualization software is highly constrained compared to the interface presented by applications and the operating system. As a result, the frequency with which vulnerabilities will be presented to attackers will be significantly less in virtualization software compared to those of applications. Of course only time will reveal the actual frequency distribution. Prior history, however, shows orders of magnitude of differences in these two types of vulnerabilities, i.e., thousands of vulnerabilities of high severity in applications and operating systems per year vs. single digit vulnerabilities in virtualization software.

In this section, an embodiment is disclosed for a Microsoft® Windows XP host 220 and a Linux guest 240. VMware workstation may be used for Windows, and OpenVZ run for the Linux inside the VMware virtual machine. The three major components are the VM control console 292, detection module 280 and a container control module 291. The VM control console 292 runs on the Windows host 220 and is configured to start and stop the VMware VM 230. The container control module 291 does the similar thing for containers (251, 252, 253, ... , 259), and is configured to create containers (251, 252, 253, ... , 259) on-the-fly. The detection module 280 monitors file changes of a container (251, 252, 253, ... , 259). It runs outside the container (251, 252, 253, ... , 259) to resist the attacks inside the container (251, 252, 253, ... , 259). Following are design details of each component.

The VM control module 292 uses VMware VIX API to start, stop and revert the VM. It accepts user input and communicates with container control module 291 when it is necessary to create a new container (251, 252, 253, ... , 259). From the Windows host 220, VMware VM is just one process. Windows host 220 should not access the files in the VM directly. Next, Ubuntu and OpenVZ may be installed inside the VMware VM. Since OpenVZ is an operating system level virtualization, Linux host can easily use is and ps command to access files and processes inside a container (251, 252, 253, ... , 259).

Figure 3:
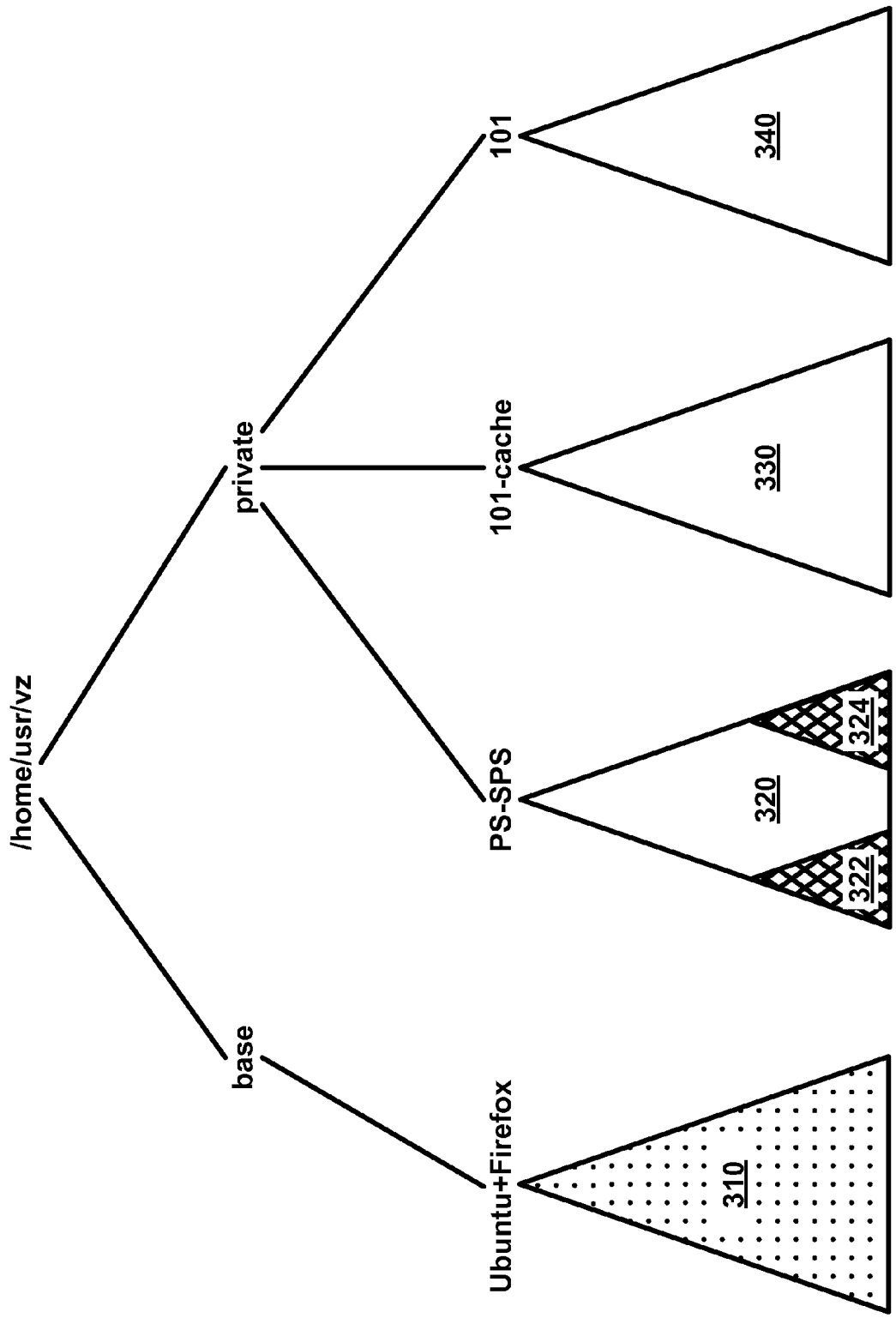
FIG. 3 is a block diagram of directories to construct container 101 running Firefox as per an aspect of an embodiment of the present invention.

Container control module 291 may be a perl script which receives message from VM control module 292 and use aufs to create containers (251, 252, 253, ... , 259) on-the-fly. FIG. 3 shows directories to construct container 101 with Firefox. There are mainly four directories: 1) Ubuntu+Firefox 310: this directory 310 contains system files and the pre-configured application (Firefox in this example) for a container. It is mounted as read-only by using aufs, so that the malware inside container cannot change it. 2) PS-SPS 320: this contains both persistent storage (PS) 324 for downloading files and semi-persistent storage (SPS) 322 for cookies, bookmark and history. They are mounted normally as read-write. 3) directory 330 101-cache is an initially empty directory. It is mounted as read-write and is used for all the other writes. After the container 101 (340) is terminated, 101-cache 330 may be removed so that any changes, including malicious changes will be removed. 4) 101 (340) is the mount point for all the previous directories.

Figure 4:
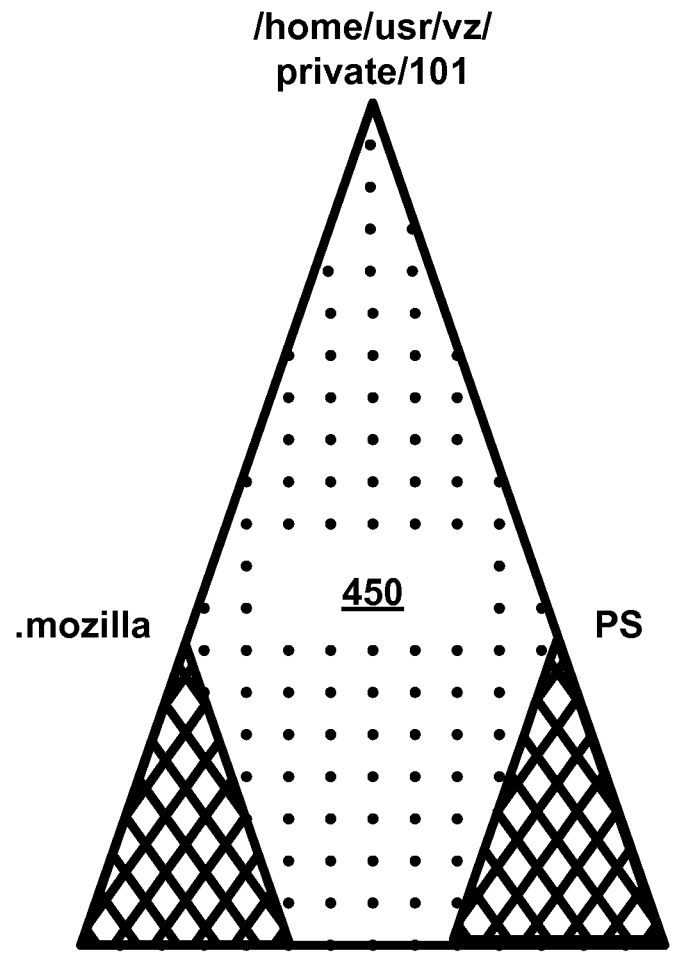
FIG. 4 is a block diagram of a unified file system for a container as per an aspect of an embodiment of the present invention.

FIG. 4 shows the unified directory 450 by using aufs. 101 is the root directory for the container 101. The applications running inside container 101 treat the underlying file system as a normal one and read or write to it. Aufs ensures that it only writes to the writable layer and cannot change read only layer. Another advantage of aufs is that the read-only layer can be shared by multiple containers. In fact, Ubuntu+Firefox may be separated into two separate directories, so that Ubuntu directory is shared among all the running containers.

The detection module 280 will now be discussed. Detection module 280 runs on the Linux host 240, outside the container. It may be another perl script which periodically scans the 101-cache directory and uses an exclusion list to exclude normal file changes such as when the container is booted up. Anything else may be treated as an unauthorized change. Once changes are detected, the detection module 280 may generate an alarm message and send it to the VM control console 292 to alarm the user.

Persistent storage 275 and semi-persistent storage will now be discussed. Persistent storage 275 may be used for the user to save file data persistently, such as downloaded files. To provide usage transparency, VMware shared folder feature may be used to allow the user access to files in the PS from the Windows host 220. All the containers (251, 252, 253, ..., 259) may share the same PS directory, so that a document file downloaded by a Firefox container can be opened by an OpenOffice container.

Semi-persistent storage may also be used and is also persistent so that files in it will survive a container termination. The difference of SPS from PS is that SPS may be used for application specific configuration or preferences files which the user does not modify and save directly. Typical examples of SPS are the cookies, bookmarks, passwords and history of a Firefox browser. The user may add bookmarks and let the browser remember the passwords through the Firefox GUI. The files for these settings may be determined and then put it into SPS.

Public browsers and secure bookmarks will now be discussed. As mentioned earlier, private container(s) may be provided for link(s) in a secure bookmark folder and a public browser container for public browsing. All these browser containers may share a single PS. For SPS, each private container may have its own SPS, so that the sensitive cookies, history and password are not shared between containers. Special icons may be setup for each private link on the user's Windows desktop, to enable the user to just double click the special icon to ensure a private browsing session.

Experimental evaluation results of a prototype embodiment 200 are now disclosed. The evaluation contains two parts: 1) the overhead and performance and 2) the effectiveness of the prototype embodiment 200 against some common attacks for browsers.

The test-bed was a Dell Dimension 9200 workstation, with Dual-core 2.4 GHz CPU and 2 GB memory. For the prototype embodiment 200, it had one virtual machine installed with 256 MB virtual memory and 1 GB virtual hard disk. The host OS 220 was Window XP home edition, and the guest OS 240 was Ubuntu server 7.10. In the Ubuntu, OpenVZ was installed and two container templates 293 built, one for public browsing with Firefox, and the other for OpenOffice.

The prototype embodiment 200 was compared to a native application and a pure VMware VM (VVM) process which use a virtual machine for each application. For VVM process a basic virtual machine was first created that takes 719 MB disk space and 128 MB memory. A VMware linked clone process was then used to create a small clone of the basic operating system. Linked clone means the new virtual machine uses the original virtual hard disk and only saves the difference to a new virtual hard disk. This process did not need to copy the entire hard disk for every VM.

The overhead of hard disk. For the prototype embodiment 200, the initial VM took a 1G hard disk which contained Ubuntu, an OpenVZ template for the browser container and an OpenOffice container. Every new container consumed used very few bytes of hard disk on the Windows host because the prototype embodiment 200 used aufs to share the basic operating system as read-only among all the containers. The small increase such as new files generated as container bootups did not incur more hard disk usage on the Windows host.

Figure 5:
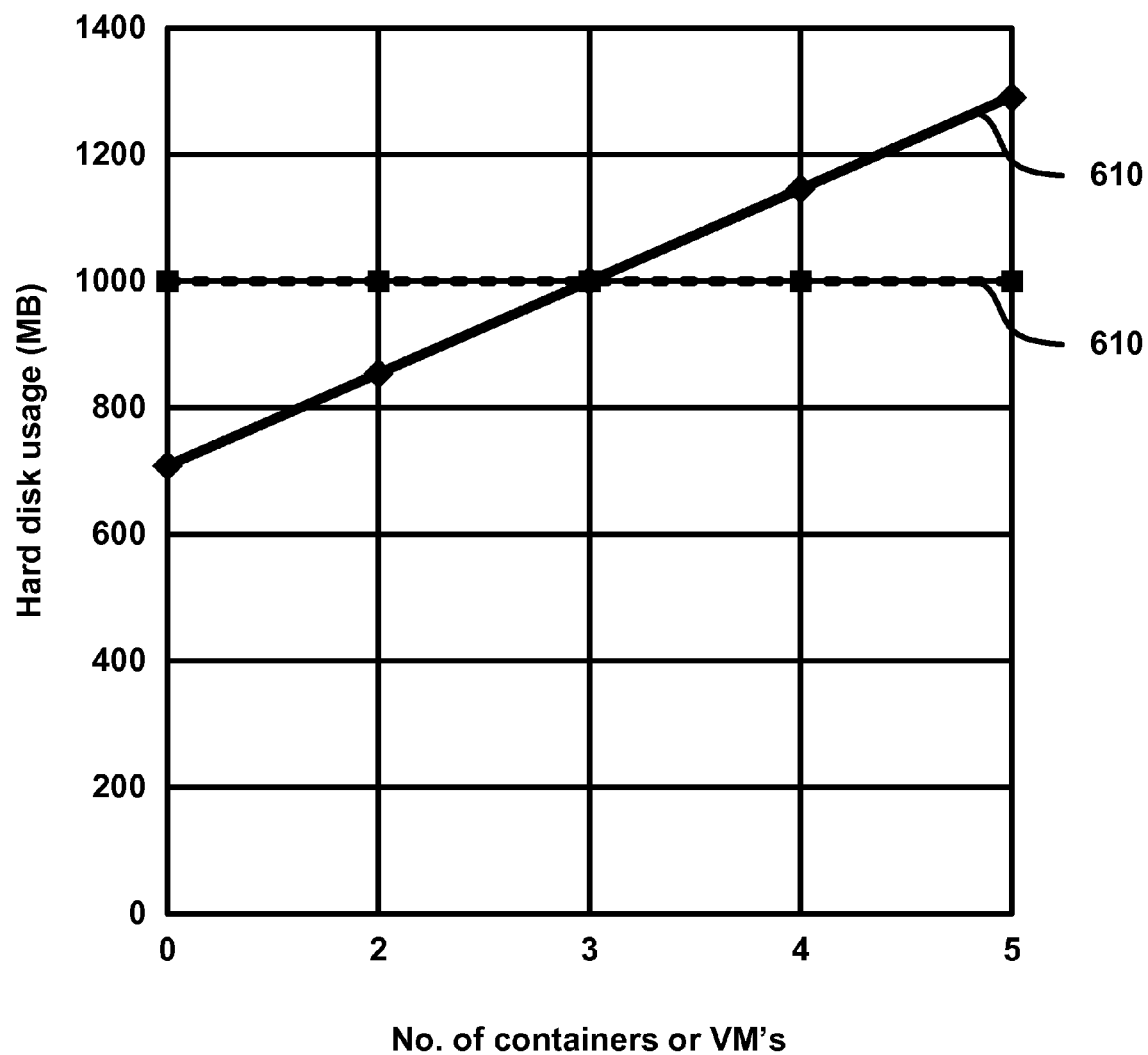
FIG. 5 is a graph showing experimental hard disk usage using an aspect of an embodiment of the present invention.

For the VVM process, each virtual machine generated a .vmem file with the same size as the physical memory (128 MB in this test) of the virtual machine, so it took 144M (128+16) for each virtual machine. The 16 MB disk space was the new virtual hard disk. This number could have increased if the virtual machines keep using and the user downloads big files. The result is shown in FIG. 5. When only one VM or one container (inside a VM) is needed, the VVM process was better than the prototype embodiment 200, because it did not need to install OpenVZ and the container templates. As the number of containers of VMs or containers increased, the VVM process increased much faster than the prototype embodiment 200 and exceeded the prototype embodiment 200 when the number of VMs or containers was bigger than four.

Figure 6:
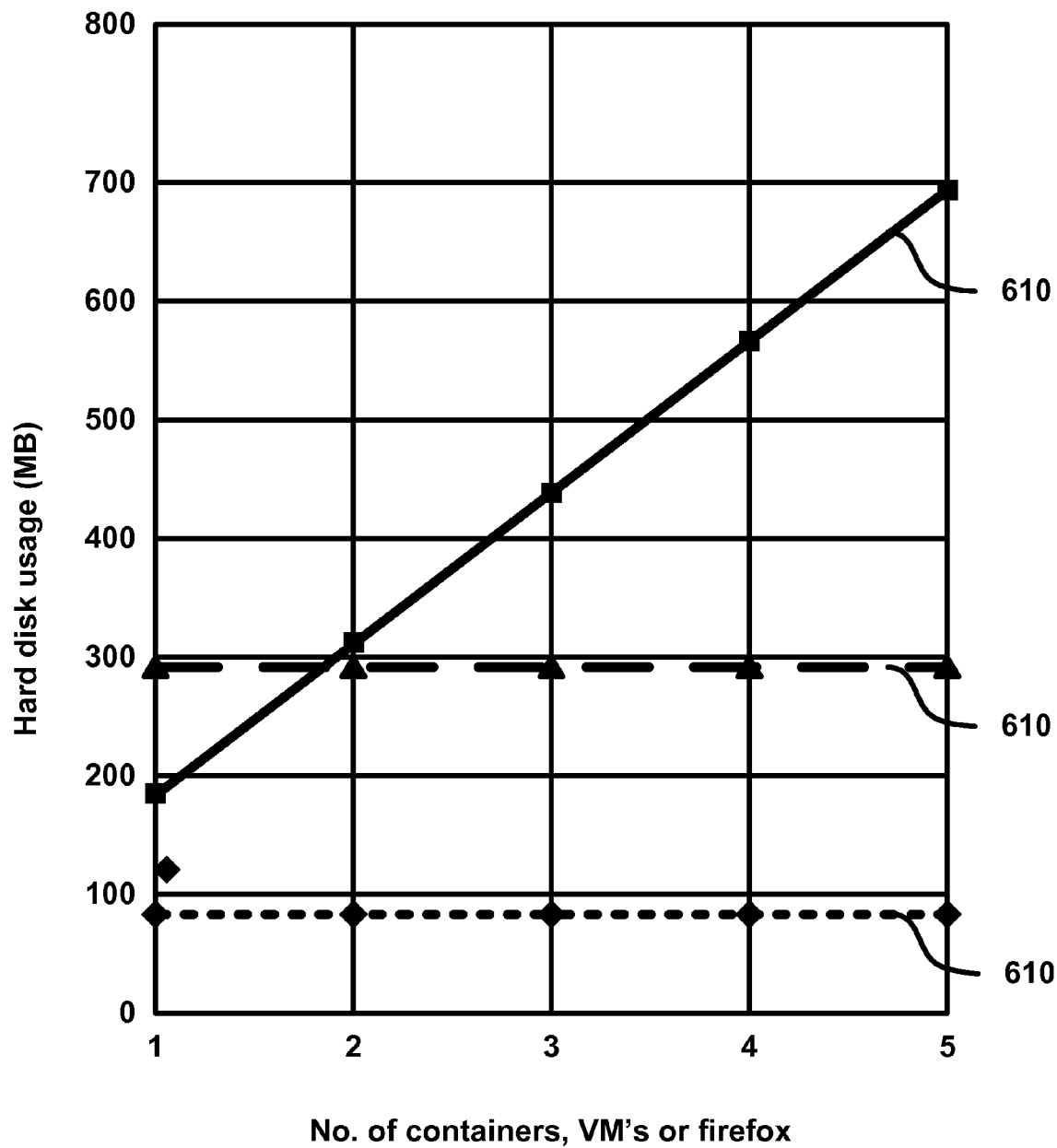
FIG. 6 is a graph showing experimental memory usage using an aspect of an embodiment of the present invention.

Second, the memory usage was measured. The result is shown in FIG. 6 and the trends are similar to the hard disk usage. The memory usage for each VMware VM is significant; every VM took more than 128 MB memory. In contrast, the memory usage for the prototype embodiment 200 kept at a stable level because it could effectively share the memory between different containers. The native Firefox browser showed a similar trend as the prototype embodiment 200 with a lower overhead.

Third, the maximum number of concurrent Firefox applications was tested with each of Firefox applications residing in its own container in the prototype embodiment 200 or VM in the VVM process. For the prototype embodiment 200, twenty containers, each of them running a Firefox browser, were started. The memory usage on the host remained the same at 297 MB. As more memory was allocated to the underlying VM, more containers and Firefox could be started. For the VVM process, it was possible to start fifteen virtual machines with Firefox at the same time and the memory usage on the host was almost exhausted.

The startup delay for starting the Firefox browser in different setups was measured, the results of which are shown in the table labeled FIG. 7A. For the prototype embodiment 200, since it was expected that the user would start public browser instances frequently, a container running in the background was pre-started. When the VM control console 292 received input that the user wanted to start a public browser instance, the VM control console 292 passed the message to the container control module 291 and the container control module 291 started a Firefox browser from the already started container. The average time for this operation was 2.9 seconds. In other cases, if the virtual machine was not running, the prototype embodiment 200 needed to start the VMware virtual machine (it is in fact a revert operation), and start the Firefox. This operation took an average of 14.2 seconds.

For the VVM process, the warm-start Firefox meant that the virtual machine was running and that the user wanted a new clean virtual machine for Firefox. The VVM process then reverted the virtual machine and started a new Firefox. This took an average of 9.1 seconds, which was 3 times longer than specializing a pre-configured browser. For a cold-start Firefox, the file cache was not warm and took an average of 23.2 seconds, which was 1.6 times longer than to revert the VM and start a browser in the prototype embodiment 200.

The last two rows in the FIG. 7A shows the start delay for native Firefox browser running on Windows. For a warm-start Firefox browser, it took 1.5 seconds, 51% of specializing a pre-configured browser instance in the prototype embodiment 200. The cold-start Firefox took 9.2 seconds.

To measure network throughput, a 3 GB large file was downloaded and the output redirected to /dev/null to remove the bottle neck of the relatively slow hard disk. The tests were repeated three times and the results averaged. Also, to minimize the effect of variability in network traffic between tests, the server and the client were both on a local network. The results are shown in the table labeled FIG. 7B. During the test, only one container and one VM was started. VMtools was also installed inside the testing VM. For the prototype embodiment 200, wget was run inside the container (which is running inside a VM); for VVM, wget was run inside a virtual machine.

FIG. 7B shows that the throughputs of both the prototype embodiment 200 and the VVM were close to that of the native Windows. The prototype embodiment 200 was slightly faster than VVM. This was attributed this to the fluctuation of the network.

To evaluate the security of the prototype embodiment 200, both a browser running on the prototype embodiment 200 and a native Firefox browser on Windows were run to visit a set of potential malicious websites. For the prototype embodiment 200, the detection module 280 was used to detect whether there was a malicious download. For native Firefox on Windows, Capture honey client was used to detect unauthorized changes. The results are shown in the table labeled FIG. 7C. In the total of 2000 web sites that were visited, six of them performed a drive-by download on native Windows Firefox, and none of them downloaded files to the prototype embodiment 200. One possible reason for no downloads on the prototype embodiment 200 is that Firefox was running on Linux and Linux is a small target compared with Windows. In addition, even if the malware exploited the vulnerabilities of Firefox, it still needed to find the vulnerabilities of OpenVZ and VMware Workstation. So the chances for success were very small compared to a native application.

So far, a system to protect the network applications by running each application or instance of application in its own virtual environment sandbox was disclosed. A prototype which uses two levels of virtualizations and provides both a strong isolation and a small running overhead was built and described. By running OS level virtualization (OpenVZ) on top of hardware level virtualization (VMware workstation), the disk and memory overhead for hardware level virtualization was significantly reduced. In addition, a detection module was used to detect the unauthorized changes for each container so that it was possible to know when to destroy the sandbox and start a new one. The overhead and performance of the prototype embodiment 200 was compared with a pure virtual machine based process and the native application. The results show that the prototype embodiment 200 is more scalable in number of sandboxes than a pure virtual machine process and that the performance is acceptable.

Additionally, the detection module may be to detect malicious process and memory-only changes. Addition, connections between private browsers and the public browser may be restricted.

Figure 8:
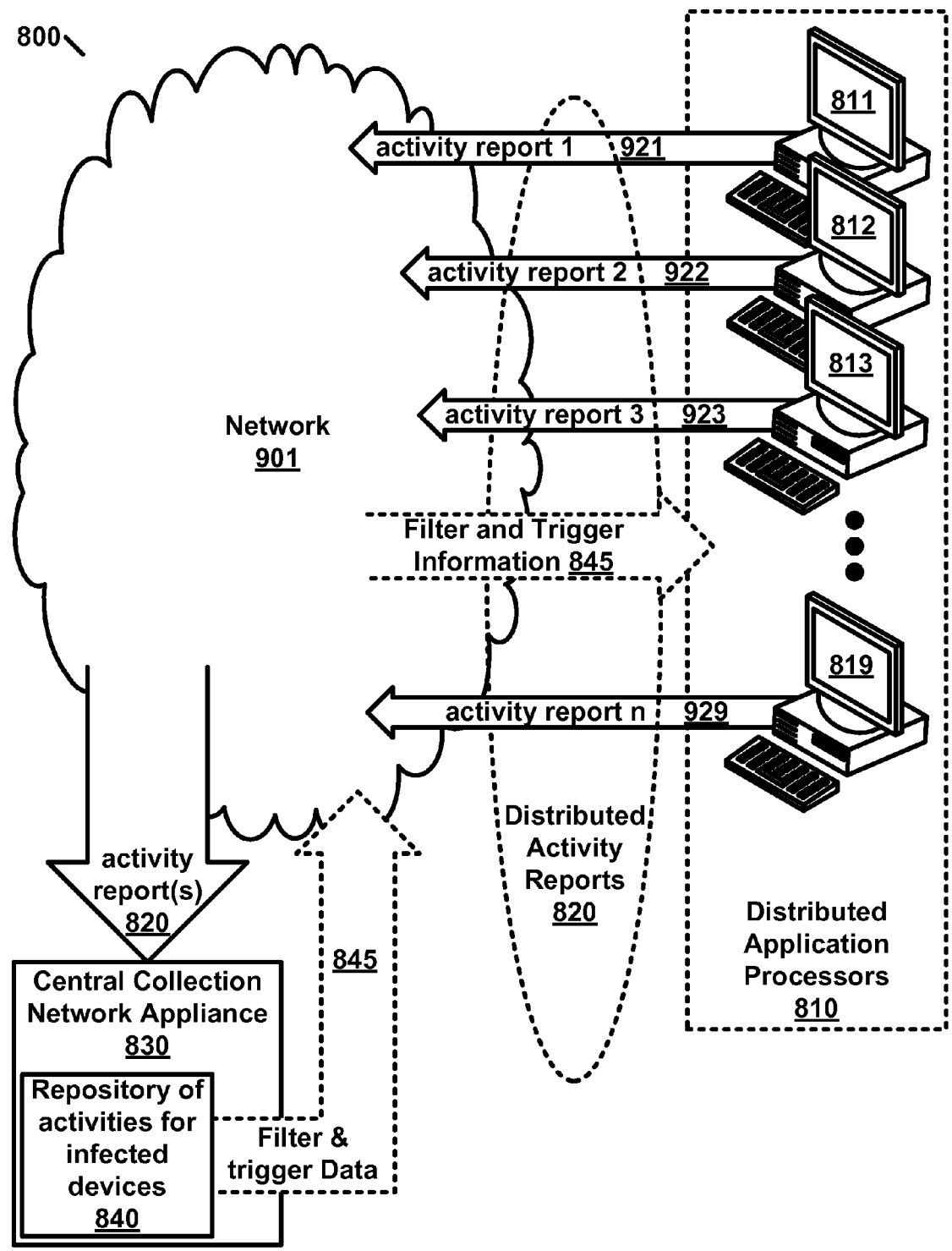
FIG. 8 is diagram of a system 800 for detecting malicious software on a network 901 as per an aspect of an embodiment of the present invention.

FIG. 8 is diagram of a system 800 for detecting malicious software on a network 901 as per an aspect of an embodiment of the present invention. In the system 800 as shown, embodiments of the application processors 810 (shown individually as 811, 812, 813, . . . , 819) are widely distributed throughout a network 901 such as the Internet. These application processors 810 act as widely distributed honey clients. They may be configured to allow diverse users to drive their application processor 810 in the distributed honey client. In other words, the distributed honey client interacts with the network 901 exactly the way users interact with the network because the application processors 810 are driven by the user of the network 901. Each of the distributed application processors 810 act as a canary since at least some of them are likely to be subjected to new cyber attacks when they first appear.

Each of the distributed application processors 810 include virtualized network applications such as a web browser. The user drives these applications. When it is determined that a virtualized application has been compromised, the activity that lead to that compromise may be recorded and the application killed (i.e. the canary dies) and may then be restored to a pristine state. The recorded activity 820 (shown individually as activity reports 921, 922, 923, . . . , 929) is sent through the network 901 to a central collection network appliance 830 where they can be stored in a repository of activities for infected devices 840. This system, when operated with a large number of distributed application processors 810 should enable the collection of statically significant results, including malicious URL's.

The central collection network appliance 830 may be configured to analyzes activity report(s) 820. Among other items, the analysis may be determine many types of useful data points, metrics and other information such as new trigger events and filter data 845. These new trigger events and filter data 845 may be downloaded for use by distributed application processor(s) 810. This collected information 845 may be used to update more traditional cyber security mechanisms throughout the network 901 such as firewalls, virus protection software or network traffic appliances. Examples of network traffic appliances include TPC/IP filters and routers, hardware firewalls and network intrusion systems.

Figure 9:
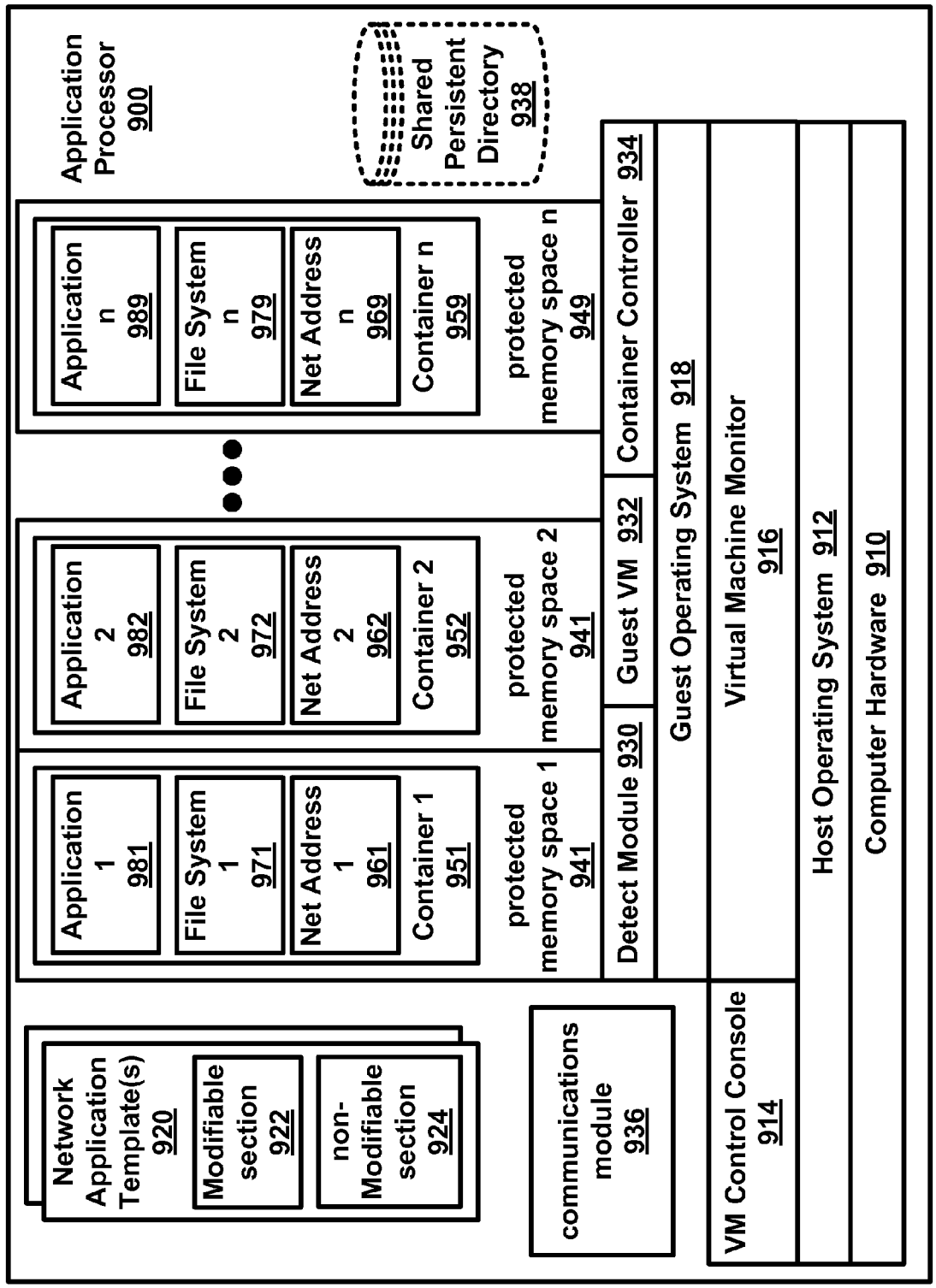
FIG. 9 is a block diagram of an application processor as per an aspect of an embodiment of the present invention.

FIG. 9 is a block diagram of an application processor 900 as per an aspect of an embodiment of the present invention. The application processor 900 includes a virtual machine monitor 916, at least one container (951, 952, . . . , 959), a detection module 930, a virtual machine control console 914, a container control module 934 and a network communications module 936.

The virtual machine monitor is configured to operate on a hardware computing machine under control of a host operating system.

Containers (951, 952, . . . , 959) are preferably configured to operate in a protected memory space (941, 942, . . . , 949) under control of a guest operating system virtual machine 932. When created each of the containers (951, 952, . . . , 959) may be initialized with a copy of a network application template 920. Each of the network application template(s) preferably includes a modifiable section 922 and a non-modifiable section 924. Additionally, each of the containers (951, 952, . . . , 959) may be configured to have a file system (971, 972, . . . , 979) and a network address (961, 962, . . . , 969).

There can be several types of containers. For example container may be private or public. Private containers may be configured to have private semi-persistent storage. Public containers may be configured to access persistent storage.

Container(s) (951, 952, . . . , 959) may reside in many locations. For example, Container(s) (951, 952, . . . , 959) may reside locally on the computing hardware 910, or on external storage mediums such as a flash drive.

To minimize the probability of a successful attack on the application processor, it may be advantageous to configure the guest operating system 918 and host operating system 912 differently. For example, in one embodiment, the host operating system 912 may be windows and the guest operating system 918 may be Linux. Likewise, another embodiment may use OSX as the host operating system 912 and windows as the guest operating system 918.

Figure 10:
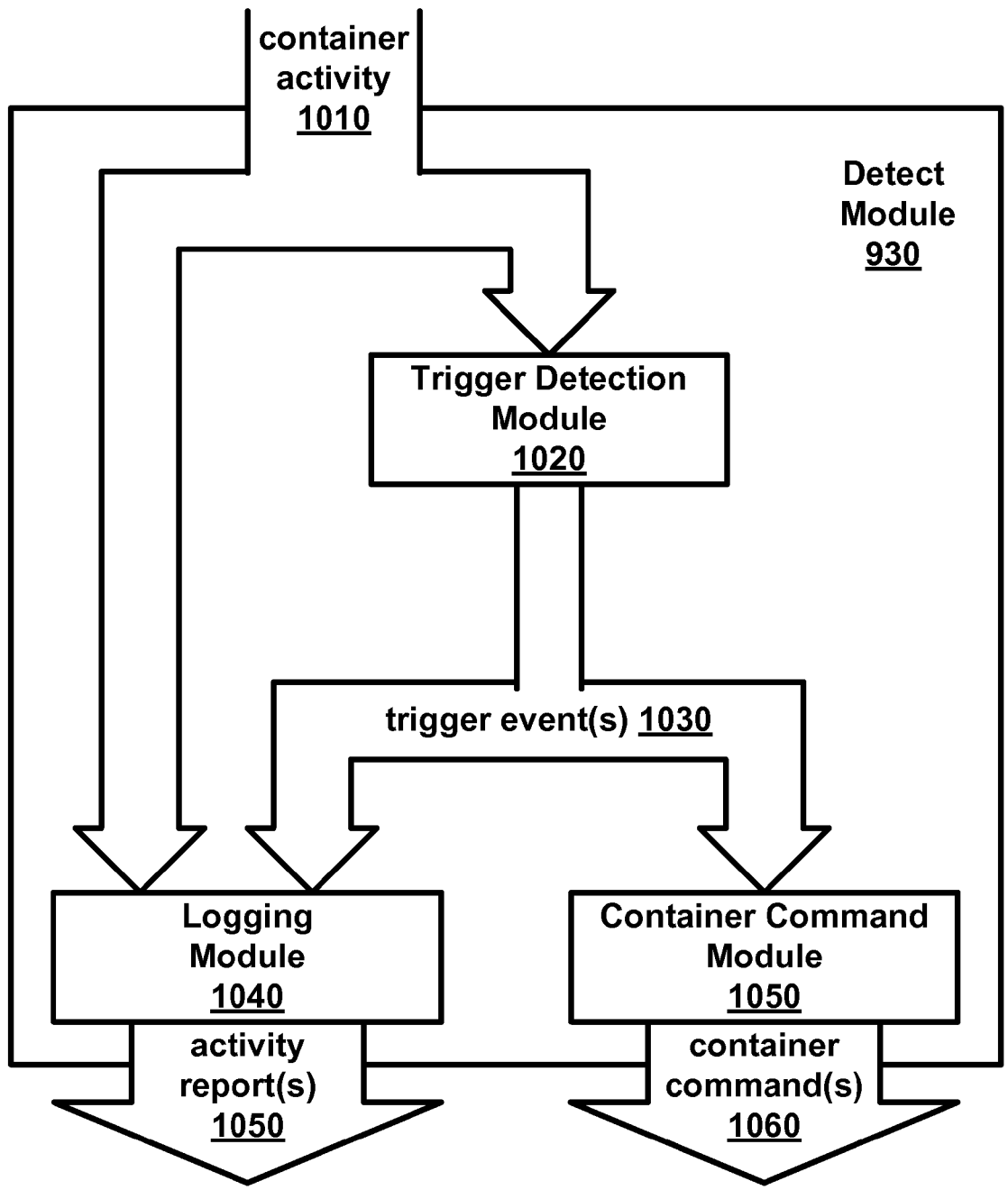
FIG. 10 is a block diagram of a detection module as per an aspect of an embodiment of the present invention

The detection module 930 is preferably configured to operate under control of the guest operating system virtual machine 932. FIG. 10 is a block diagram of a detection module 930 as per an aspect of an embodiment of the present invention. As shown, the detection module 930 includes a trigger detection module 1020, a logging module 1040, and a container command module 1060.

The trigger detection module 1020 is preferably configured to monitor activity 1010 from container(s) for a trigger event 1030. Trigger events may include, but not limited to: unauthorized changes to the a non-modifiable section; registry writes; the start of new processes; web sites visited; redirected URL's; infection details; event timelines; network connections; file system writes; and configuration changes.

The logging module 1040 is preferably configured to write activity 1010 to an activity report(s) 1050 in response to the trigger event 1030. Activity report(s) 1050 may include, but are not limited to: unauthorized changes to the a non-modifiable section; registry writes; the start of new processes; web sites visited; redirected URL's; infection details; event timelines; network connections; file system writes; and configuration changes. The logging may correlate unauthorized events with URLs. The logging module 1040 may correlate changes to the current opening or last visited URL(s). The activity report may be searchable by many variables including, but not limited to: MD5 hash values; time intervals; web sites; hosts; process names; and remote connections.

The container command module 934 is preferably configured to conditionally issue container commands 1060 in response to the trigger event(s) 1030. The container commands 1060 include, but are not limited to, container stop commands, container revert commands and container start commands.

Figure 11:
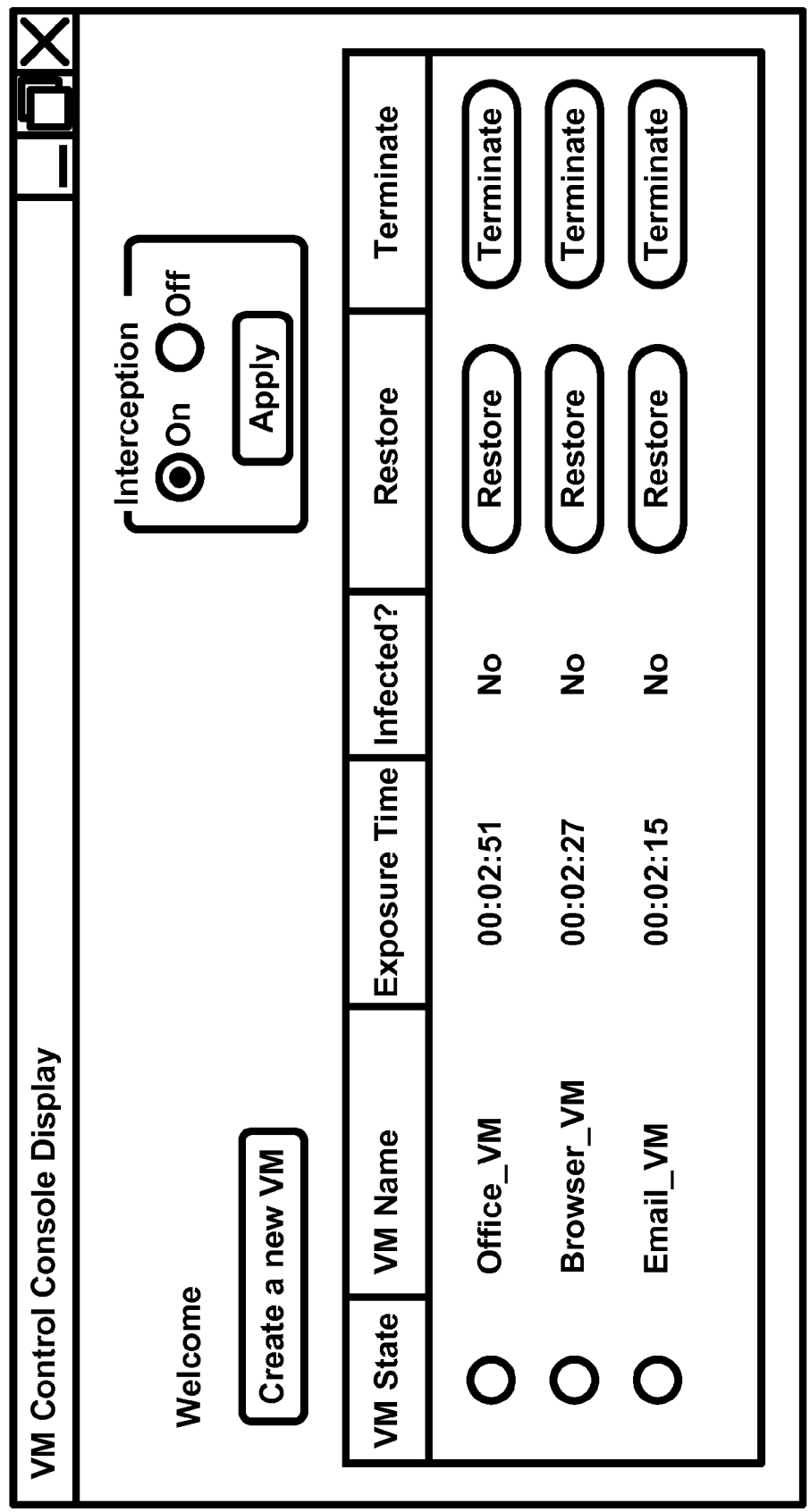
FIG. 11 is a diagram of an example display from a VM control console as per an aspect of an embodiment of the present invention.

The virtual machine control console 914 is preferably configured to operate under control of the host operating system 912 and to start and stop the hardware virtual machine monitor 916. FIG. 11 is a diagram of an example display from a VM control console 914 as per an aspect of an embodiment of the present invention. The display may be hidden or shown on the display of the host operating system 912. As shown, the display of the VM control console 914 shows the health status of the virtual machines. Mouse over details may be applied to allow a user to examine details about each application (981, 982, . . . , 989). Various parameters may be shown on the display including, but not limited to: time of exposure, and rootkit/malware detection. Controls may be provided to give a user the ability to: clean a machine. The cleaning operation command may restore a container back to a pristine state, either on-demand or on a schedule. Additional controls may include create new machines on demand and destroy machines.

Figure 12:
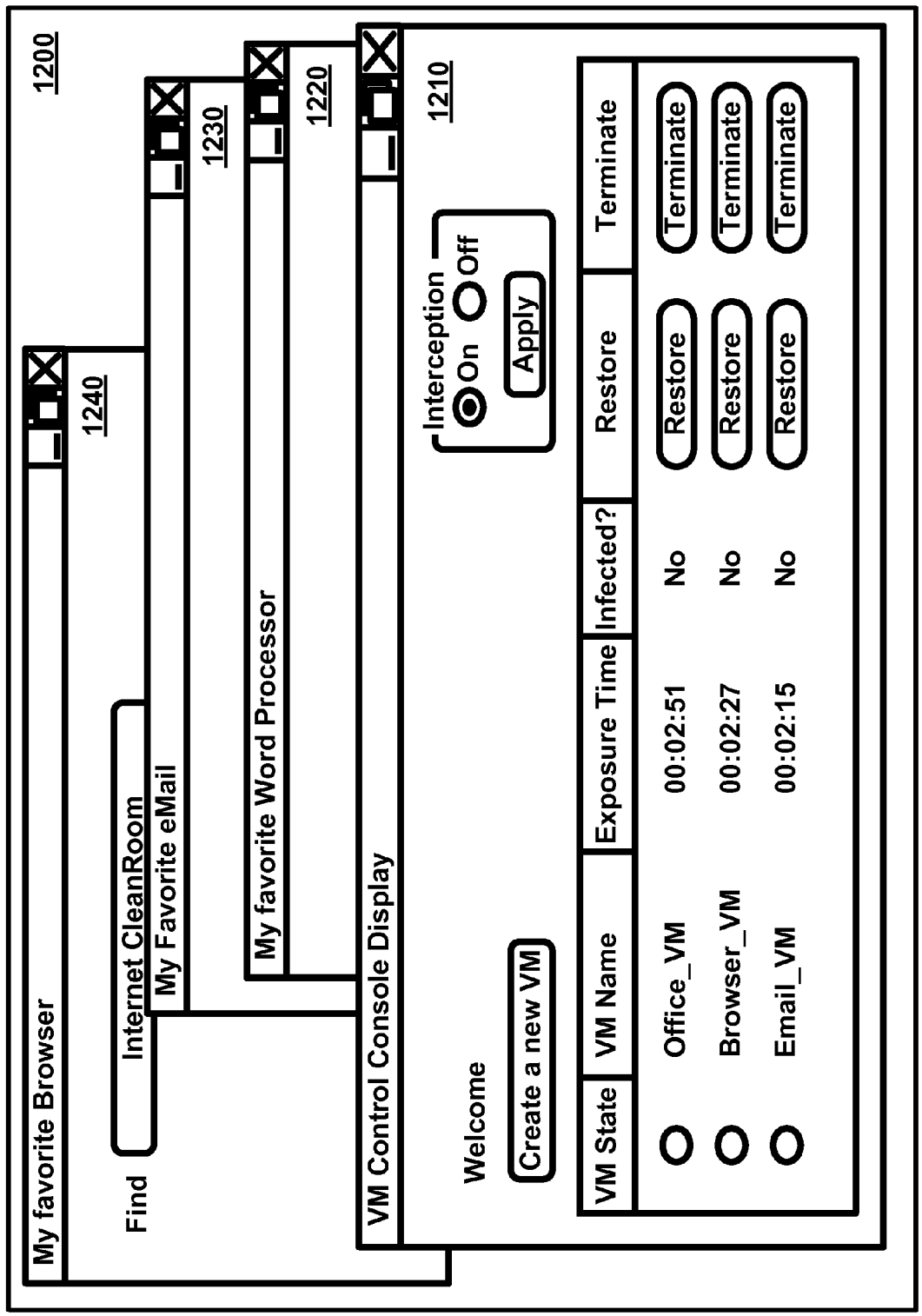
FIG. 12 is a diagram of an example host operating system display showing a display for a VM control console as well as projected displays for word processing application, an email application, and a browser application, applications running in three containers as per an aspect of an embodiment of the present invention.

To make the application processor 900 user friendly, it may be advantageous to make several configurations to minimize the fact that applications (981, 982, . . . , 989) are being run in containers (951, 952, . . . , 959). For example, the application processor 900 may be configured to have the container output displayed by the host operating system 912. Likewise, virtual machine windows may be hidden. FIG. 12 is a diagram of an example host operating system display 1200 showing a display 1210 for a VM control console 914 as well as projected displays for word processing application 1220, an email application 1230, and a browser application 1240, applications running in three containers.

The container control module 934 is preferably configured to operate under control of the guest operating system virtual machine 932. This module should execute the container commands. For example, it should start a container in response to a container start command, stop a container in response to a container stop command and to revert a container in response to the container revert command. Container commands can come from multiple sources including the detection module 930 or the host operating system 912. The source of commands may be explicitly limited to enhance security.

The network communications module 936 is preferably configured to transmit activity reports (such as 921, 922, . . . , 929) over network 901.

Additionally, the application processor 900 may include a shared persistent directory 938 configured to operate under control of the host operating system 912. This shared directory may be set to accessible by select container(s) (951, 952, . . . , 959). In some embodiments, access to the shared directory 938 may be limited.

In this specification, "a" and "an" and similar phrases are to be interpreted as "at least one" and "one or more."

Many of the elements described in the disclosed embodiments may be implemented as modules. A module is defined here as an isolatable element that performs a defined functions and has a defined interface to other elements. The modules described in this disclosure may be implemented in hardware, software, firmware, wetware (i.e. hardware with a biological element) or a combination thereof, all of which are behaviorally equivalent. For example, modules may be implemented as a software routine written in a computer language (such as C, C++, FORTRAN, Java, Basic, Malta or the like) or a modeling/simulation program such as SimuLink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. An apparatus, comprising:
a memory including a shared persistent directory; and
a hardware processor configured to execute a virtualization module at least partially stored in the memory, the hardware processor configured to execute the virtualization module under control of a host operating system, the virtualization module configured to provide a first layer of network application isolation,
the hardware processor configured to execute one or more virtual environments, each virtual environment from the one or more virtual environments configured to operate in a protected memory space, the one or more virtual environments configured to operate under control of a guest operating system operating within the virtualization module, each virtual environment from the one or more virtual environments configured to provide a second layer of network application isolation operating within the first layer of network application isolation,
each virtual environment from the one or more virtual environments is associated with at least one network application,
the virtualization module configured to provide isolation between the host operating system and the second layer of network application isolation,
the shared persistent directory configured to operate within the first layer of network application isolation, each virtual environment from the one or more virtual environments configured to store information associated with the at least one network application associated with that virtual environment from the one or more virtual environments in the shared persistent directory, access to data associated with the host operating system by each virtual environment from the one or more virtual environments is restricted to the shared persistent directory.

2. The apparatus of claim 1, wherein each virtual environment from the one or more virtual environments is initiated by the first layer of network application isolation.

3. The apparatus of claim 1, wherein the guest operating system is a first type operating system and the host operating system is a second type operating system different from the first type operating system.

4. The apparatus of claim 1, wherein at least one of the one or more virtual environments resides on a rewritable external storage medium.

5. The apparatus of claim 1, wherein the virtualization module is configured to discard the protected memory space associated with a virtual environment from the one or more virtual environments after the virtual environment is released by the at least one network application associated with the virtual environment.

6. The apparatus of claim 1, wherein each virtual environment from the one or more virtual environments is inaccessible by the remaining virtual environments from the one or more virtual environments.

7. The apparatus of claim 1, wherein the one or more virtual environments includes a plurality of virtual environments.

8. The apparatus of claim 1, wherein the one or more virtual environments is configured to be executed within the guest operating system.

9. The apparatus of claim 1, wherein the first layer of network application isolation is a first type of network application isolation and the second layer of network application isolation is a second type of network application isolation different from the first layer of network application isolation.

10. The apparatus of claim 1, wherein the first layer of network application isolation is hardware level virtualization, the second layer of network application isolation is operating system level virtualization.

11. The apparatus of claim 1, wherein the one or more virtual environments includes a first virtual environment and a second virtual environment, the first virtual environment configured to isolate a network application executing within the first virtual environment from a network application executing within the second virtual environment.

12. The apparatus of claim 1, wherein the virtualization module is configured to isolate from the host operating system the at least one network application associated with a virtual environment from the one or more virtual environments.

13. A system, comprising:
a memory; and
a hardware processor configured to execute a trigger detection module at least partially stored in the memory, the trigger detection module configured to detect at least one unauthorized activity in a virtual environment (1) associated with a network application, and (2) configured to provide a first layer of network application isolation that operates under control of a guest operating system operating within a second layer of network application isolation,
the at least one unauthorized activity includes at least one of, at least one unauthorized change to a non-modifiable section of the virtual environment, at least one registry write, at least one start of a new process, at least one corruption to an existing process, at least one web site visited, at least one redirected Uniform Resource Locator (URL), at least one infection detail, at least one event timeline, at least one network connection, at least one file system write, or at least one configuration change,
the trigger detection module configured to operate under control of a host operating system,
the hardware processor configured to execute a logging module, the trigger detection module configured to send a message to the logging module reporting the at least one unauthorized activity,
the hardware processor configured to send, to a central collection network appliance and over a network, information associated with the at least one unauthorized activity such that the central collection network appliance (1) maintains a repository of the information associated with the at least one unauthorized activity, (2) analyzes the information associated with the at least one unauthorized activity to determine at least one event that triggered the at least one unauthorized activity, and (3) transmits the information associated with the at least one unauthorized activity to at least one network traffic appliance.

14. The system of claim 13, wherein the trigger detection module is configured to gather the information associated with the at least one unauthorized activity, before sending the message.

15. The system of claim 13, wherein the logging module is configured to record at least one change due to the at least one unauthorized activity.

16. The system of claim 13, wherein the second layer of network application isolation is provided by a virtual machine monitor.

17. The system of claim 13, wherein the at least one unauthorized activity includes the at least one unauthorized change to the non-modifiable section of the virtual environment.

* * * * *